US006780097B2

(12) United States Patent
Shuttleworth et al.

(10) Patent No.: US 6,780,097 B2
(45) Date of Patent: Aug. 24, 2004

(54) TWO PIECE VEHICLE ROOF STRUCTURE HAVING AN INTEGRATED HVAC SYSTEM

(75) Inventors: Adam Joe Shuttleworth, Denver, IA (US); Bruce Kevin Fryk, Waverly, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 10/354,248

(22) Filed: Jan. 29, 2003

(65) Prior Publication Data

US 2004/0144850 A1 Jul. 29, 2004

(51) Int. Cl.[7] .................................................. B60H 1/00
(52) U.S. Cl. ........................................ 454/136; 454/158
(58) Field of Search ................................ 454/136, 137, 454/138, 139, 141, 158

(56) References Cited

U.S. PATENT DOCUMENTS 2,817,281 A 12/1957 Schwan et al.
3,522,839 A * 8/1970 Wendt et al. ................. 165/44
3,524,398 A * 8/1970 Winfrey ..................... 454/136
3,532,377 A 10/1970 Grasseler
3,841,430 A 10/1974 Babbitt Jr., et al.
3,868,896 A 3/1975 Doll, et al.
4,088,364 A 5/1978 Termont
4,097,085 A 6/1978 Nelson
4,120,527 A 10/1978 Lawrence
4,133,574 A 1/1979 Martin
4,189,987 A 2/1980 Amberg et al.
4,503,749 A 3/1985 Kuhn et al.
4,641,502 A 2/1987 Aldrich et al.
4,648,311 A * 3/1987 Slosiarek et al. ........... 454/158
4,658,598 A 4/1987 Schulz
4,660,462 A 4/1987 Thompson et al.
4,721,031 A 1/1988 Nakata et al.
4,739,853 A 4/1988 Ogilvie
5,342,238 A 8/1994 Segerpalm et al.
5,690,549 A 11/1997 Webb et al.
5,906,411 A 5/1999 Stauffer et al.
5,913,566 A * 6/1999 Stauffer et al. .......... 296/190.1
5,921,619 A 7/1999 Cederberg et al.
6,086,145 A 7/2000 Wandyez
6,120,090 A 9/2000 Van Ert et al.
6,279,978 B1 8/2001 Schreyer et al.
6,309,012 B1 10/2001 Fryk et al.
6,409,947 B1 6/2002 Wandyez
2003/0045225 A1 * 3/2003 Ruckert et al. ............. 454/158

FOREIGN PATENT DOCUMENTS

DE 27 24 019 * 12/1978 ................. 454/138
EP 0 733 503 B1 8/1996
JP 57-155118 * 9/1982 ................. 454/158
JP 5-65020 * 3/1993 ................. 454/158
RU 1066846 A 10/1982
RU 1495146 A1 12/1987

* cited by examiner

*Primary Examiner*—Harold Joyce

(57) ABSTRACT

A two piece molded roof structure is provided for enclosing the cab of a work vehicle. The roof structure has an upper roof member mounted to a lower roof member. The lower roof member has a plurality of contours and apertures for receiving the components of an HVAC system, and for defining air passages. When the upper and lower roof members are joined discrete air passages are formed between the roof members. The roof structure includes fresh and recirculated air intakes communicating via an uncirculated air duct and with an HVAC core chamber housing an HVAC core. Filters are mounted in the air intakes. One or more blowers communicate between the core chamber and a conditioned air duct which has vents communicating with the cab interior. Air is thus drawn in through the intakes and directed through the unconditioned air duct to the HVAC core and then the blower expels the air into the conditioned air duct and into the vehicle cab.

8 Claims, 6 Drawing Sheets

24
25
30
30
44
44
46
50
50
36
36
38
70

14
64
74
75
74
64
76
72
62

TWO PIECE VEHICLE ROOF STRUCTURE HAVING AN INTEGRATED HVAC SYSTEM

FIELD OF THE INVENTION

The present invention relates generally to structural members which are used in the construction of a vehicle body. More particularly, the present invention relates to that portion of the vehicle body which carries or encloses a person at the location on the body where the operation of the vehicle is controlled including constructional elements of the cab such as a framework or panel or joint or such similar element. Specifically, the present invention relates to the roof portion of the cab structure having means for the treatment of cab atmosphere, such as heating, cooling or ventilating the air within the cab.

BACKGROUND OF THE INVENTION

It is well known that work vehicles such as agricultural tractors and equipment as well as construction equipment are frequently operated in less than ideal environmental conditions. For example such equipment is often operated in uncomfortably warm or cold weather and in dusty conditions caused by the work being done by the vehicle. It has thus been desired to provide operator's stations in such vehicles which insulate the operator from such adverse environmental conditions by filtering and conditioning the air inside the cab. One approach has been to dispose the components of an HVAC system in a housing having air inlet and outlet apertures. The housing is then mounted to the vehicle roof or installed into the roof structure. This results in a cumbersome structure which does not optimize the available space and frequently intrudes into the operator's station impairing the free movement of the operator and sometimes obstructing the operator's field of view. Similarly, the ducts, hoses, conduits, wiring and inlet and outlet vents are typically positioned based upon available space rather than efficient ergonomic placement.

Previous attempts at overcoming these disadvantages have involved the use of one piece roto-molded roof structures which have a well or compartment formed therein to receive the HVAC unit and having air ducts and vents molded into the roof structure. Such attempts have created their own disadvantages. For example, roto-molded parts do not have a high degree of dimensional stability and thus present a number of fit, mount-up, and aesthetic difficulties. Further, one piece designs do not allow access for servicing, and present difficulties in the routing of conduit and wiring.

Accordingly, there is a clear need in the art for a molded roof structure for a work vehicle which incorporates the components of an HVAC system into the structure itself in a way that facilitates servicing, routing of lines, and ergonomic placement of ducts and vents.

SUMMARY OF THE INVENTION

In view of the foregoing, it is an object of the invention to provide a two piece roof structure having the necessary intakes, ducts and vents for the HVAC system formed therein.

Another object of the invention is the provision of a two piece roof structure having means for housing the HVAC components within the roof itself.

A further object of the invention is to provide a two piece roof structure which facilitates servicing of HVAC components and routing of HVAC lines.

An additional object of the invention is the provision of a two piece roof structure which can be compression molded using known techniques.

The foregoing and other objects of the invention together with the advantages thereof over the known art which will become apparent from the detailed specification which follows are attained by a two piece vehicle roof structure comprising: a lower roof member; a core chamber formed in the lower roof member; at least one HVAC core disposed in the core chamber; at least one fresh air duct molded in the lower roof member; at least one first air intake aperture in the fresh air duct; at least one first filter element removably mounted in the first air intake aperture; at least one unconditioned air duct communicating between the fresh air intake aperture and first filter element and the HVAC core chamber; at least one second air intake aperture in the unconditioned air duct; at least one second filter element removably mounted to the second air intake aperture; at least one conditioned air duct formed in the lower roof member; at least one conditioned air vent in the conditioned air duct; at least one blower disposed in the core chamber, the blower having an inlet and an outlet, the inlet drawing air from the core chamber and the outlet expelling air into the conditioned air duct; and, an upper roof member mounted to the lower roof member to enclose the core chamber, the unconditioned air duct, and the conditioned air duct to form discrete air passages between the roof members.

Other objects of the invention are attained by a two piece vehicle roof structure comprising: an upper roof member; a lower roof member having an upper side and a lower side; a core chamber formed in the lower roof member; at least one HVAC core disposed in the core chamber; at least one fresh air duct molded in the lower side of the lower roof member; at least one fresh air intake louver removably mounted to the fresh air duct; at least one first air intake aperture in the fresh air duct; at least one fresh air filter removably mounted in the first air intake aperture; at least one fresh air dust tray removably mounted to the fresh air duct; at least one unconditioned air duct communicating between the fresh air intake aperture and fresh air filter and the HVAC core chamber; at least one second air intake aperture in the unconditioned air duct; at least one recirculated air filter removably mounted to the second air intake aperture; at least one conditioned air duct formed in the lower roof member; at least one conditioned air vent formed in the conditioned air duct; and, at least one blower disposed in the core chamber, the blower having an inlet and an outlet, the inlet drawing air from the core chamber and the outlet expelling air into the conditioned air duct; wherein the upper roof member is mounted to the lower roof member to enclose the core chamber, the unconditioned air duct, and the conditioned air duct to form discrete air passages between the roof members.

Still other objects of the invention are attained by a two piece roof structure for enclosing one or more sidewalls to define a vehicle cab comprising: a lower roof member; a core chamber formed in the lower roof member, the core chamber having at least one condensate well and drain; at least one HVAC core comprising heating and cooling elements disposed in the core chamber, the HVAC core having input and output lines; at least one fresh air duct molded in the lower roof member; at least one fresh air intake louver removably mounted to the fresh air duct; at least one first air intake aperture in the fresh air duct; at least one fresh air filter removably mounted in the first air intake aperture; at least one fresh air dust tray removably mounted to the fresh air duct; at least one unconditioned air duct communicating between the fresh air intake aperture and fresh air filter and the HVAC core chamber, wherein the lines of the HVAC core are routed through the unconditioned air duct; at least one second air intake aperture in the unconditioned air duct; at least one recirculated air filter removably mounted to the second air intake aperture; at least one conditioned air duct formed in the lower roof member, the conditioned air duct having a duct cover affixed thereto; at least one conditioned air vent formed in the conditioned air duct the conditioned air vent having a control louver affixed thereto; at least one blower disposed in a contoured blower area of the core chamber, the blower having an inlet and an outlet, the inlet drawing air from the core chamber and the outlet expelling air into the conditioned air duct, wherein the lower roof member includes a partition wall adjacent to the blower area for routing air from the unconditioned air duct through the HVAC cores; an upper roof member having at least one removable access panel covering at least one access aperture mounted to the lower roof member to enclose the core chamber, the unconditioned air duct, and the conditioned air duct to form discrete air passages between the roof members, the upper roof member and lower roof member having a mastic seal interposed therebetween, and wherein one of the one or more sidewalls defining the vehicle cab are interposed between the first air intake aperture and the second air intake aperture so that the first air intake aperture receives air from outside the cab and the second air intake aperture receives air from inside the cab.

In general, a two piece molded roof structure is provided for enclosing the cab of a work vehicle. The roof structure has an upper roof member mounted to a lower roof member. The lower roof member has a plurality of contours and apertures for receiving the components of an HVAC system, and for defining air passages. When the upper and lower roof members are joined discrete air passages are formed between the roof members. The roof structure includes fresh and recirculated air intakes communicating via an unconditioned air duct and with an HVAC core chamber housing an HVAC core. Filters are mounted in the air intakes. One or more blowers communicate between the core chamber and a conditioned air duct which has vents communicating with the cab interior. Air is thus drawn in through the intakes and directed through the unconditioned air duct to the HVAC core and then the blower expels the air into the conditioned air duct and into the vehicle cab.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWING

For a complete understanding of the objects, techniques, and structure of the invention reference should be made to the following detailed description and accompanying drawings, wherein.

DESCRIPTION OF THE PREFERRED EMBODIMENT

Figure 1:
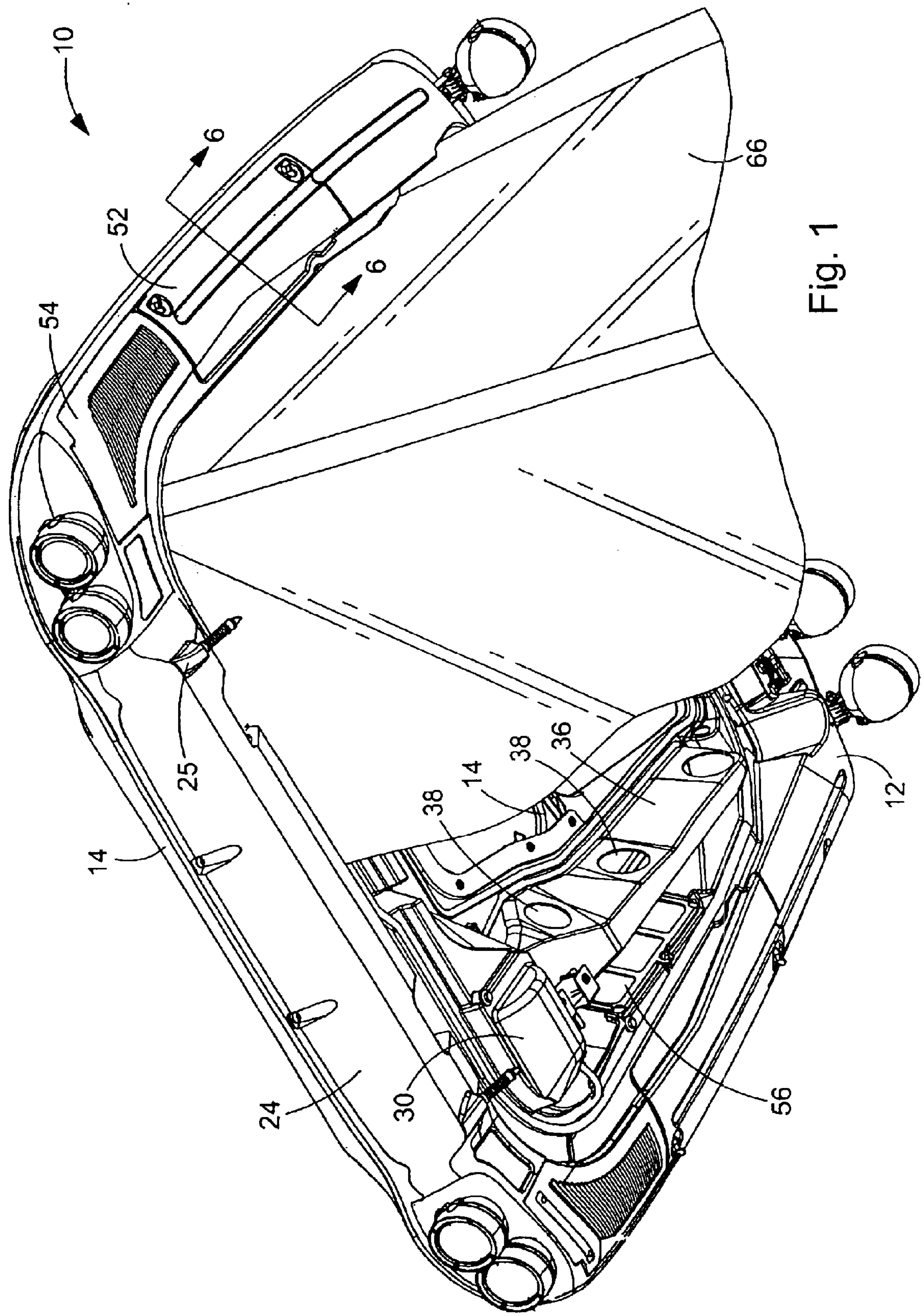
FIG. 1 is a perspective view of a portion of a vehicle cab showing the roof structure of the present invention.
Figure 2:
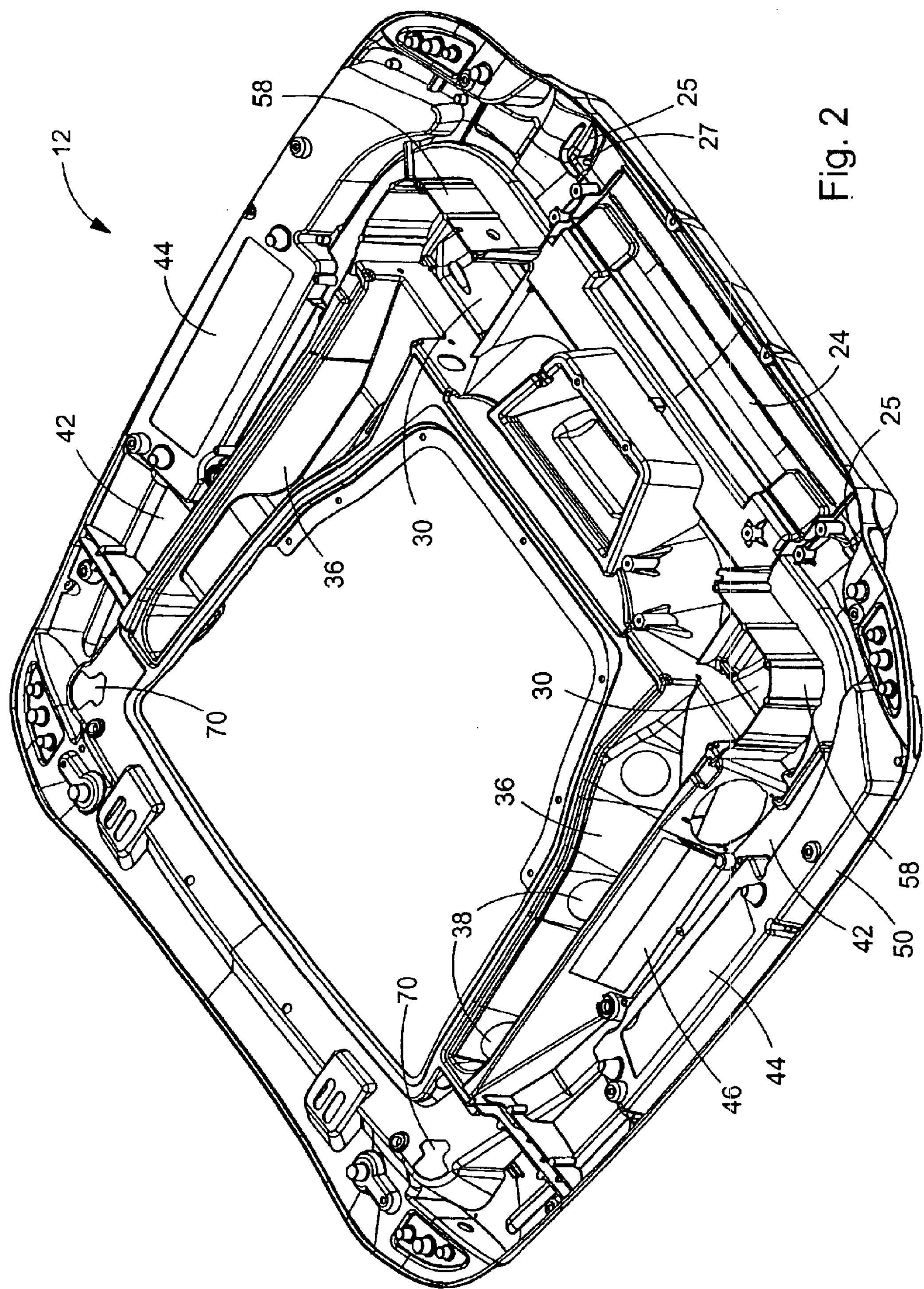
FIG. 2 is a perspective view of the upper side of the lower roof member.
Figure 3:
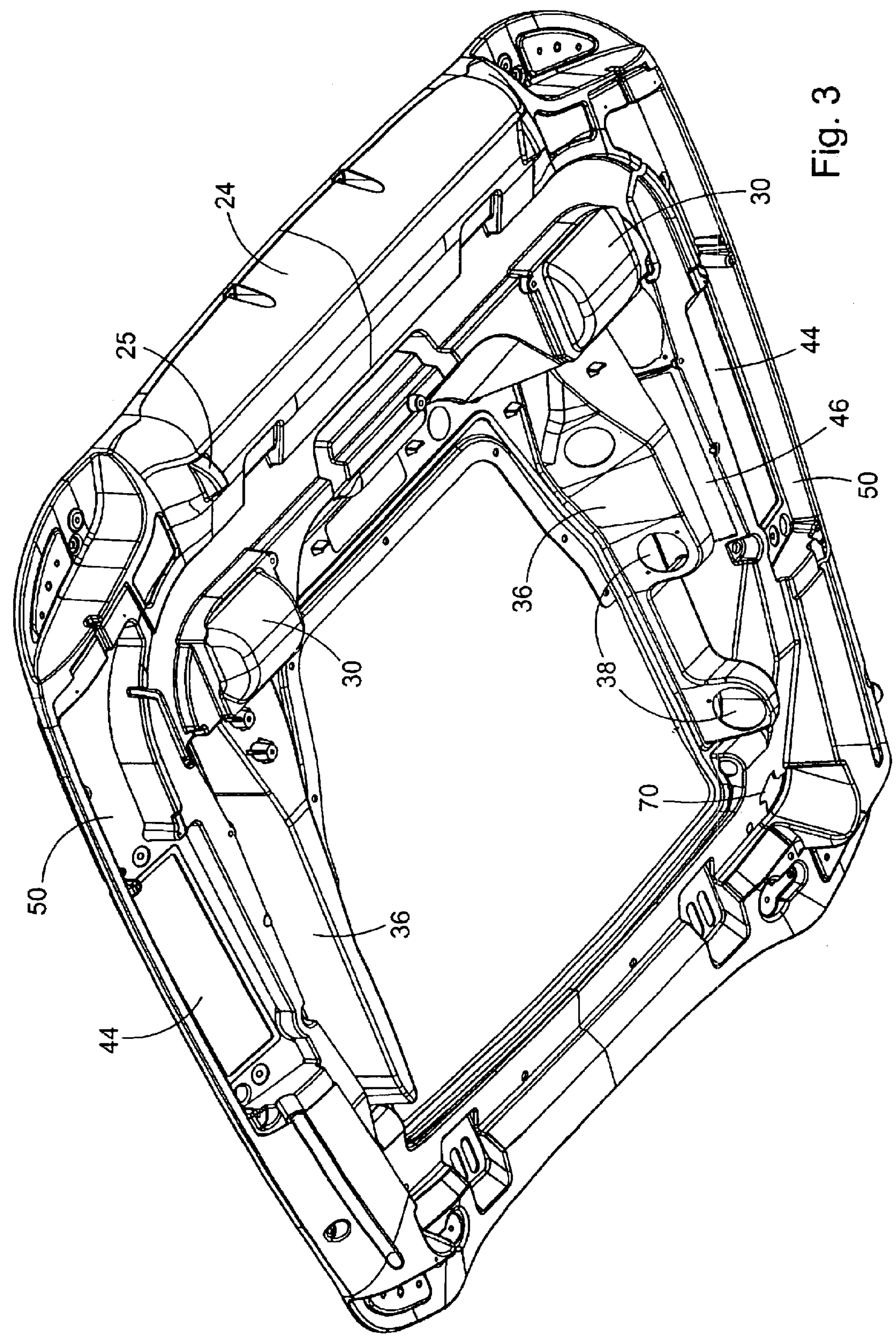
FIG. 3 is a perspective view of the lower side of the lower roof member.
Figure 4:
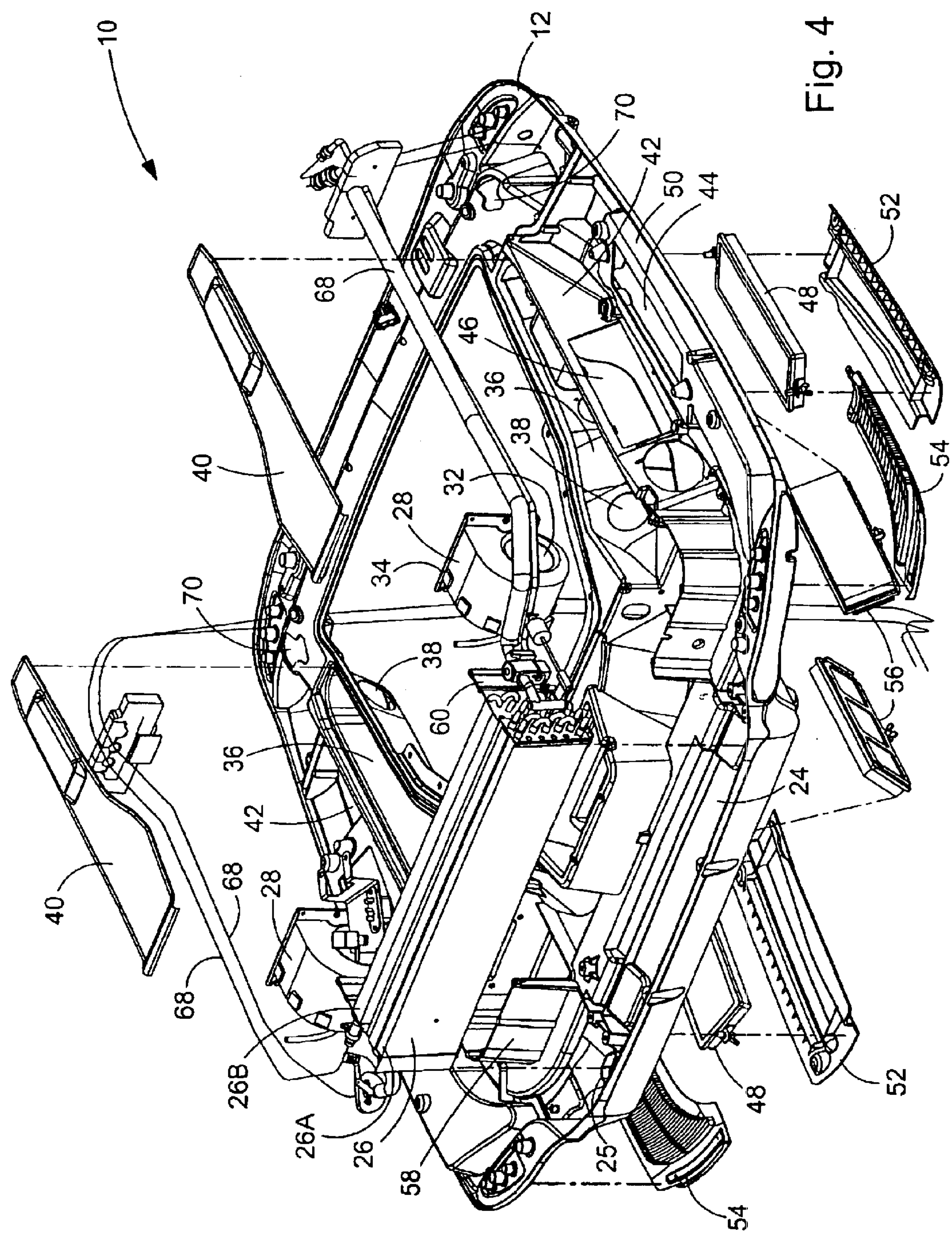
FIG. 4 is an exploded perspective view showing the lower roof member and the components of the HVAC system.
Figure 5:
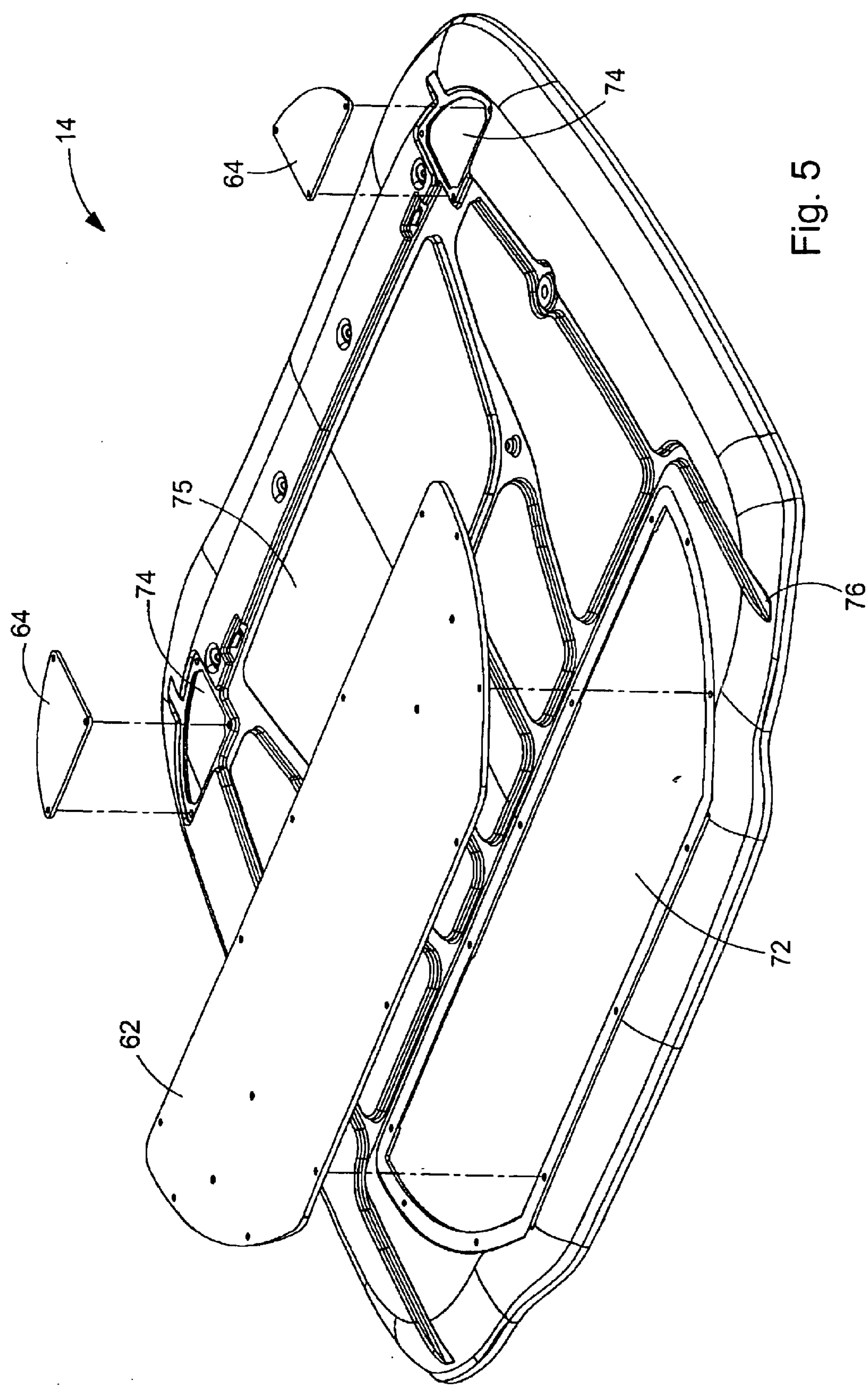
FIG. 5 is an exploded perspective view of the upper side of the upper roof member; and, FIG. 6 is a cross-sectional view of the roof structure of FIG. 1 taken along the line 6—6.
Figure 6:
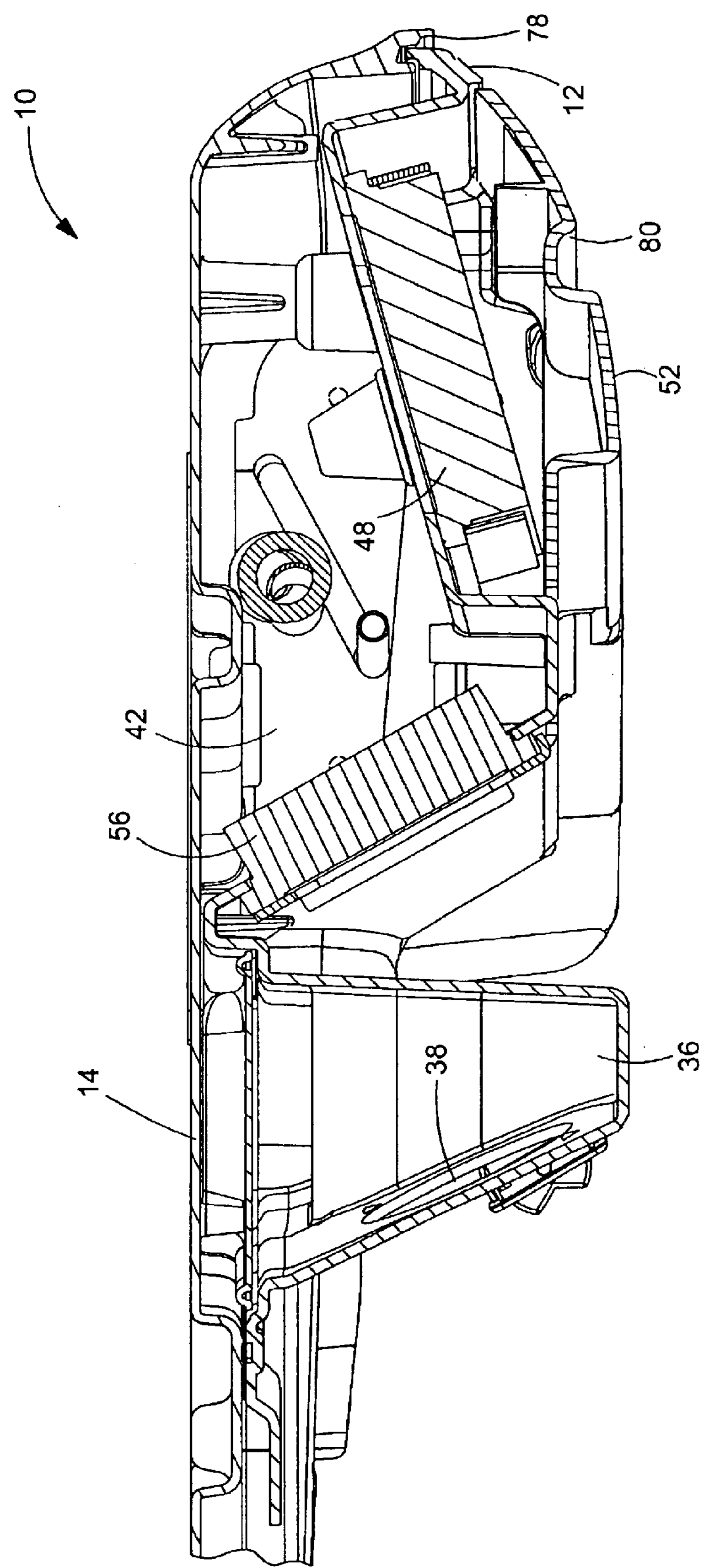

Referring now to the drawings it will be seen that a two-piece molded roof is designated generally by the numeral 10. Roof 10 is comprised generally of a lower roof member 12 and an upper roof member 14. Roof members 12 and 14 are preferably compression molded from a sheet molding compound (SMC). SMC is typically a thermoset composite material comprised of polyester or vinyl ester resin, glass fiber, calcium chloride and in some cases pigment. This material is formed into parts using a vertical press with a matched steel mold. With reference to the drawings it will be seen that lower roof member 12 is a unitarily molded structure having a plurality of apertures, contours, and recesses molded therein. A core chamber 24 is provided in the lower roof member 12 for receiving the HVAC cores 26. HVAC cores 26 are preferably comprised of an air conditioning evaporator 26A and a heater core 26B to provide both heating and cooling functions. The thermoswitch and resistor for the HVAC can also be mounted in the core chamber 24 by means of an appropriate bracket or the like. Core chamber 24 is also provided with a pair of condensate wells 25 having condensate drain apertures 27 therein for draining away condensate from the cores 26. Appropriate drain tubes and/or valves may be connected at the apertures 27 to direct the flow of condensate as needed. A pair of blowers 28 are disposed in the core chamber 24 in blower areas 30, specially contoured to receive the blowers 28. Each blower 28 has an air inlet 32 and an air outlet 34. A pair of conditioned air ducts 36 are formed in the lower roof member 12 adjacent to the blower areas 30 such that conditioned air from HVAC cores 26 is passed through the blowers 28 via the air inlets 32 and expelled at an elevated pressure and velocity into the conditioned air ducts 36. The conditioned air is distributed into the cab by way of conditioned air vents 38 molded in the conditioned air ducts 36 of lower roof member 12. While the drawings depict three conditioned air vents 38 in each duct 36, those skilled in the art will recognize that more or less vents may be utilized in various locations as dictated by need or desire. It should be apparent that each conditioned air vent 38 may be fitted with control louvers (not shown) to allow an operator to more precisely control the amount and direction of air flow within the cab. Conditioned air ducts 36 may be fitted with duct covers 40 to maintain the conditioned air at an elevated pressure within the ducts 36 while allowing for insulation between the conditioned air ducts 36 and the upper roof member 14. Duct covers 40 are optional and may be used to seal the conditioned air ducts 36. Alternatively sealing means may be provided between the lower 12 and upper 14 roof members to provide air-tight enclosure of the ducts 36 in lieu of duct covers 40. It is preferred to use a foam or mastic type seal between the duct covers 40 and the lower roof member 12 to ensure an air-tight enclosure.

Adjacent to each conditioned air duct 36 is an unconditioned air duct 42. Each unconditioned air duct 42 includes a first air intake aperture 44 and a second air intake aperture 46. First air intake aperture 44 is disposed along the outer periphery of the lower roof member 12 and is adapted to receive a first filter element 48. First filter element 48 is removably fitted into a fresh air duct 50 molded into the underside of lower roof member 12 and surrounding the first air intake aperture 44. Fresh air duct 50 is enclosed by both a removable dust tray 52 in the vicinity of the first filter element 48 and by a fresh air intake louver 54. Thus fresh air is drawn in through intake louver 54 and passed through first filter element 48 before entering the unconditioned air duct 42. The second air intake apertures 46 are each disposed adjacent to and opposite the first air intake apertures 44 in the unconditioned air duct 42. A second filter element 56 is removably fitted to the second air intake aperture 46. Those having skill in the art will recognize that the unconditioned air ducts 42 are under vacuum induced by the blowers 28. Thus unconditioned air entering the second air intake aperture 46 is passed through the second filter element 56 before entering the unconditioned air duct 42. It should be apparent from the drawings that the conditioned air ducts 36 are isolated from the unconditioned air ducts 42. Accordingly, unfiltered, unconditioned air is drawn into the air intake apertures 44 and 46 and passes through filter elements 48 and 56 respectively to enter the unconditioned air duct 42. The filtered air is then directed through the HVAC cores 26 where it is either heated or cooled. The conditioned air then passes into the core chamber 24 and further into the blowers 28. The blowers 28 expel the conditioned air at an elevated pressure and velocity into the conditioned air duct 36 where it is directed into the cab by way of the conditioned air vents 38. Partition walls 58 are provided in the lower roof member 12 to ensure that unconditioned air is passed through, rather than around, the HVAC cores 26. Tabs 60 are provided on the HVAC core assembly to matingly engage the partition walls 58. Lines 68 to and from the HVAC cores 26 are routed through the unconditioned air ducts 42 to apertures 70 provided in the lower roof member 12 for connection to components located elsewhere on the vehicle.

Upper roof member 14 has essentially the same peripheral profile as the lower roof member 12. Accordingly, upper roof member 14 is matingly fitted to the lower roof member 12 to enclose the areas containing the HVAC components. As such the upper roof member 14 serves to enclose the ducts 36 and 42 and the core chamber 24 to form discrete air passages within the roof 10. However, as previously discussed above duct covers 40 may be utilized to enclose the conditioned air ducts 36. Upper roof member 14 further includes removable access panels 62 and 64 to permit servicing of the HVAC components through access apertures 72 and 74 respectively. It should also be noted that the roof 10 may be provided with a sun roof (not shown) without interfering with the HVAC system. To provide roof 10 with a sun roof it is only necessary to remove the portion of upper roof member 14 designated at 75 and enclose the resulting aperture with an appropriate window or the like which may be hinged, retractable or removable. Roof member 14 also includes drainage channels 76 for directing the flow of rain. Those having skill in the art will recognize that it may be desirable to provide roof 10 with weather stripping and insulation between the members 12 and 14. It will also be recognized that roof members 12 and 14 may be joined together using any one of a number of conventional means including thread cutting fasteners and/or adhesives. It is preferred to use a mastic type seal around the periphery of the roof members 12 and 14 to provide a weatherproof seal for the assembled roof 10. Foam strip insulation may also be used to seal the optional duct covers 40 and/or between the roof members. Additional foam strip insulation may be employed within the roof 10 to prevent air movement in areas where dead air is used as an insulating technique.

When assembled roof 10 serves to provide the roof portion of a cab enclosure for an agricultural vehicle or the like. As such the remainder of the cab enclosure is defined by a floor (not shown) and sidewalls 66. Sidewalls 66 may be in the form of metal, plastic or glass panels which are joined to the roof 10 through conventional means. It should be noted that the sidewalls 66 are sealed to the lower roof member 12 between the first air intake apertures 44 and the second air intake apertures 46. Thus outside air, which tends to be dirtier under working conditions, is drawn into the roof 10 by way of intake louvers 54 and is filtered by first filter elements 48. Excess debris is trapped in the dust trays 52. First filter elements 48 can be serviced by removing and emptying the dust trays 52 from outside the cab to provide access to the filter element 48. Cab air is recirculated by drawing air from inside the cab through the second air intake aperture 46 and second filter element 56. Second filter element 56 may be serviced from inside the cab. Unconditioned air from inside and outside the cab is combined in the unconditioned air duct 42 before being directed to the HVAC cores. When assembled the roof 10 further includes a pair of drip edges 78 and 80 which serve to facilitate dripping of water at the prescribed locations rather than being directed to the sidewalls 66 and the seal between the sidewalls 66 and roof 10. A first drip edge 78 is provided at the joint between upper roof member 14 and lower roof member 12 around the periphery of roof 10. Drip edge 78 allows a large percentage of the water flowing off roof 10 to drip off without flowing into the sidewall area. Excess water which flows past first drip edge 78 and over the lower surface of lower roof member 12 drips away at the second drip edge 80. Second drip edge 80 is formed by a concave channel molded into lower roof member 14.

It is contemplated that the various air intakes, vents, filters and the like may be provided in various locations and numbers without departing from the scope and spirit of the invention. For example it may be desirable to provide access to all filters from inside or outside the cab as the vehicle design dictates. It is further contemplated that the roof 10 may be fitted with a number of fixtures such as lights, entertainment systems or instrumentation which may necessitate relocation of the above described elements of the invention, such variations are within the scope of the invention.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. A two piece roof structure for enclosing one or more sidewalls to define a vehicle cab comprising:

a lower roof member;

a core chamber-formed in the lower roof member, the core chamber having at least one condensate well and drain;

at least one HVAC core comprising heating and cooling elements disposed in the core chamber, the HVAC core having input and output lines;

at least one fresh air duct molded in the lower roof member;

at least one fresh air intake louver removably mounted to the fresh air duct;

at least one first air intake aperture in the fresh air duct;

at least one fresh air filter removably mounted in the first air intake aperture;

at least one fresh air dust tray removably mounted to the fresh air duct;

at least one unconditioned air duct communicating between the fresh air intake aperture and fresh air filter and the HVAC core chamber, wherein the lines of the HVAC core are routed through the unconditioned air duct;

at least one second air intake aperture in the unconditioned air duct;

at least one recirculated air filter removably mounted to the second air intake aperture;

at least one conditioned air duct formed in the lower roof member, the conditioned air duct having a duct cover affixed thereto;

at least one conditioned air vent formed in the conditioned air duct the conditioned air vent having a control louver affixed thereto;

at least one blower disposed in a contoured blower area of the core chamber, the blower having an inlet and an outlet, the inlet drawing air from the core chamber and the outlet expelling air into the conditioned air duct, wherein the lower roof member includes a partition wall adjacent to the blower area for routing air from the unconditioned air duct through the HVAC cores;

an upper roof member having at least one removable access panel covering at least one access aperture mounted to the lower roof member to enclose the core chamber, the unconditioned air duct, and the conditioned air duct to form discrete air passages between the roof members, the upper roof member and lower roof member having a mastic seal interposed therebetween, and wherein one of the one or more sidewalls defining the vehicle cab are interposed between the first air intake aperture and the second air intake aperture so that the first air intake aperture receives air from outside the cab and the second air intake aperture receives air from inside the cab.

2. A two piece roof structure according to claim 1 wherein the HVAC cores have tabs to matingly engage the partition walls.

3. A two piece roof structure according to claim 1 wherein a resistor and thermo switch for the HVAC cores are mounted in core chamber.

4. A two piece roof structure according to claim 1 wherein the upper and lower roof members are compression molded from sheet molding compound.

5. A two piece roof structure according to claim 1 wherein the upper roof member includes a sun roof.

6. A two piece roof structure according to claim 1 further comprising at least one drip edge.

7. A two piece roof structure according to claim 6 wherein the at least one drip edge is a concave channel formed in the lower roof member.

8. A two piece roof structure according to claim 6 wherein the at least one drip edge is provided at a joint between the upper and lower roof members.

* * * * *